United States Patent [19]

Kimbrell et al.

[11] Patent Number: 4,659,539
[45] Date of Patent: Apr. 21, 1987

[54] NUCLEAR REACTOR

[75] Inventors: James E. Kimbrell, Penn Hills; Charles H. Boyd; David A. Altman, both of Plum Borough; Donald G. Sherwood, Monroeville; Glenn E. Bost, Pleasant Hills, all of Pa.

[73] Assignee: Westinghouse Electric Corp., Pittsburgh, Pa.

[21] Appl. No.: 490,101

[22] Filed: Apr. 29, 1983

[51] Int. Cl.⁴ ............................................. G21C 15/00
[52] U.S. Cl. .................... 376/377; 376/399; 376/401; 376/406
[58] Field of Search ............... 376/292, 352, 353, 399, 376/401, 406, 377

[56] References Cited

U.S. PATENT DOCUMENTS

| T921,019 | 4/1974 | Barry | 376/399 |
| 2,982,713 | 5/1961 | Sankovich et al. | 376/353 |
| 3,849,257 | 11/1974 | Bevilacqua | 376/353 |
| 4,173,513 | 11/1979 | Obermeyer et al. | 376/353 |

FOREIGN PATENT DOCUMENTS 3009937 9/1981 Fed. Rep. of Germany .

OTHER PUBLICATIONS

Berger et al., Neutronenphysikalische Aspekte Eines Fortgeschrittenen Druckwasser-Reaktors (FDWR), Atomkernenergiekerntechnik BD. 39 (1981) Lfg. 2.
Glasstone et al., Nuclear Reactor Engineering, Van Nostrand Reinhold Company, N.Y., 1981, pp. 754–758.

Primary Examiner—Deborah L. Kyle
Assistant Examiner—Richard W. Wendtland
Attorney, Agent, or Firm—Daniel C. Abeles

[57] ABSTRACT

To preclude failure of components of control-rod assemblies or of unprotected control rods (WDRC's) a calandria is provided above the upper internals. The calandria includes hollow tubes through which the drive rods for the various control rods pass and which protect the drive rods. The guides for the control rods are closed except at the top so that the coolant flows vertically through the guides into the calandria. In the calandria, the coolant flows transversely to the hollow tubes and out through the outlet nozzle. The tubes have a mass and stiffness and strength such that they resist failure by reason of the transverse flow of the coolant to which they are subjected.

17 Claims, 9 Drawing Figures ically water at about 600° F. and 2000 pounds per
NUCLEAR REACTOR

CROSS-REFERENCE TO RELATED APPLICATIONS

Application Ser. No. 490,097 filed Apr. 29, 1983 to Luciano Veronesi for Nuclear Reactor and assigned to Westinghouse Electric Corp., is incorporated herein by reference.

BACKGROUND OF THE INVENTION

This invention relates to nuclear reactors and has particular relationship to reactors in which a coolant, typically water at about 600° F. and 2000 pounds per square inch, is circulated through the nuclear core. In the interest of aiding the understanding of this invention by dealing with a concrete reactor, this application deals predominantly with pressurized water reactors. However, the invention is applicable to reactors of other types and to the extent that it applies to the other reactors such application is within the scope of equivalents of this invention. The core includes the fuel and is disposed in the lower region of the reactor vessel. In addition, the reactor includes control-rod assemblies. Control-rod assemblies include control rods, supports for the control rods, drive rods for the control rods and guides for the control rods and, in some reactors, other related components. The core with its fuel assemblies is usually referred to as the lower internals of the reactor. The guides and other fixed parts above the core are referred to as the upper internals of the reactor. The control rods are movable between the upper internals and recesses or thimbles in the core by drive rods.

The control rods are mounted in clusters on their supports. There are rod control clusters (RCC's) in which the rods have a high absorption cross-section for neutrons. These clusters are used to reduce the power or shut down the reactor and are moved between the core and their guides a number of times during the fuel cycle of a reactor. There are so-called gray control rods of substantially lower neutron absorption cross-section than the high-absorption RCC's and they serve for load follow or to moderate or control the power of the reactor. Gray rods are moved, during their life times between the core and the guides many times (typically 5,600), substantially more than the high-absorption RCC's, during the fuel cycle of a reactor. There are water-displacement rod clusters (WDRC'S). These rods are of about the same diameter as the RCC's. The WDRC's displace the water in the thimbles which do not receive RCC's or gray rods. Their function is to maintain the level of the soluble neutron poison low during earlier operation of the reactor and to permit the level of the soluble neutron poison to remain low during the later operation of the reactor. Such clusters are in the core during earlier operation, typically during the first 60% of the fuel cycle, and are raised into the upper internals during the remainder, typically 40% of the fuel cycle. Typically the control rods are tubular. In this application and in its claims, the expression "control-rods", unless modified by wording signifying a specific type of rod, means any or all of the above-described control rods. There are nuclear reactors which do not include gray control rods or WDRC's and there are reactors in which the control is effected by blades instead of rods. Such reactors are within the scope of equivalents of this invention.

Typically, the RCC's and the gray rods in their clusters are carried by cruciform supports and are movable inside of hollow cruciform guides. These guides conventionally have holes or slots through which coolant flows. The WDRC's are not so protected. A large number of these tubes are movable in rectangular or square guides which conventionally have holes through which the coolant flows. During the later part of the fuel cycle, the WDRC's are moved into and remain in perforated guides. All guides are part of the upper internals of the reactor.

The coolant flows vertically through the core and into the upper internals. The outlet nozzles of the vessel are disposed between the ends of the upper internals and they conduct the coolant horizontally. In nuclear reactors in accordance with the teachings of the prior art, the coolant then flows generally horizontally or transversely through the control-rod assemblies in passing to the nozzles. Typically the vertical flow of the coolant through the core has a velocity of about 16 ft/sec. The flow through the nozzles has a velocity of about 50 ft/sec and the flow through some regions of the upper internals may be as high as 30 or 40 ft/sec. At these velocities, the coolant causes the vertical members and particularly the WDRC's, during the later part of the fuel cycle, to vibrate. The mechanisms which may cause the vibrations include vortex shedding, turbulent buffeting, fluid-elastic interaction, and cavitation.

It is an object of this invention to prevent failure of the components of the control-rod assemblies and particularly of the WDRC's by reason of the transverse flow of the coolant.

SUMMARY OF THE INVENTION

In accordance with this invention, a nuclear reactor is provided in which a tubular structure similar to a calandria is mounted above the upper internals. A calandria strictly defined is an evaporator having tubes surrounded by steam through which the liquid to be concentrated uses. The liquid returns through a well in the center. For want of a better name, the tubular structure will herein be referred to as a calandria notwithstanding that the inner member of a CANDU reactor is also referred to as a calandria and that the structure does not have the central well. The calandria has hollow members within which the drive rods for the control rods are contained and protected. The coolant flow is maintained generally vertical by the guides of the upper internals. The guides transmit the coolant to the interior of the calandria through their tops. The coolant flows transversely over the hollow members of the calandria and out through the outlet nozzle. The mass and stiffness and strength of these hollow members is such that their resonant velocity is far out of the range of the velocity of the coolant and they are resistant to failure from turbulence, cavitation or like phenomena.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF THE EMBODIMENTS

Figure 1:
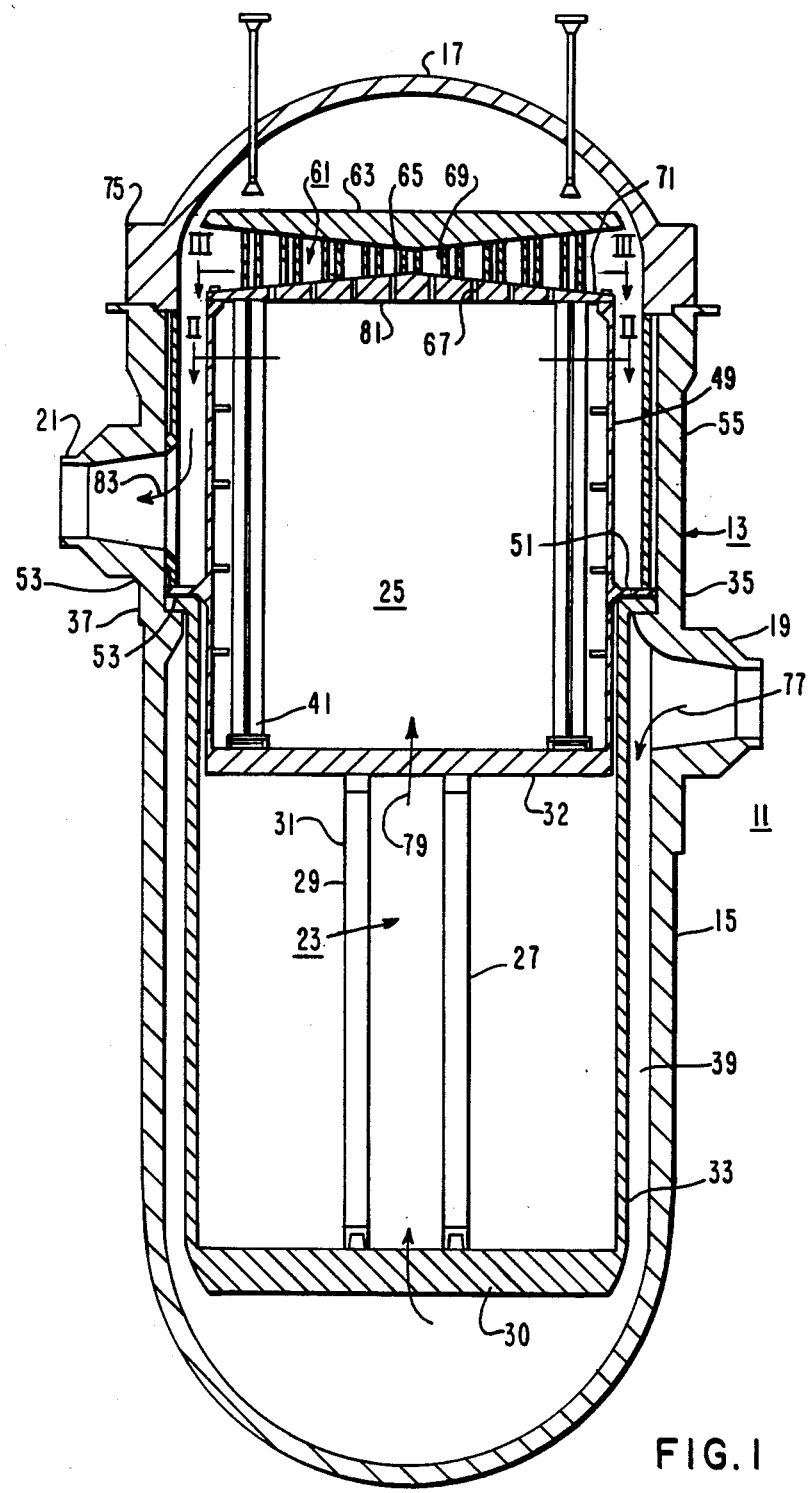
FIG. 1 is a view in longitudinal section of an embodiment of this invention.
Figure 2:
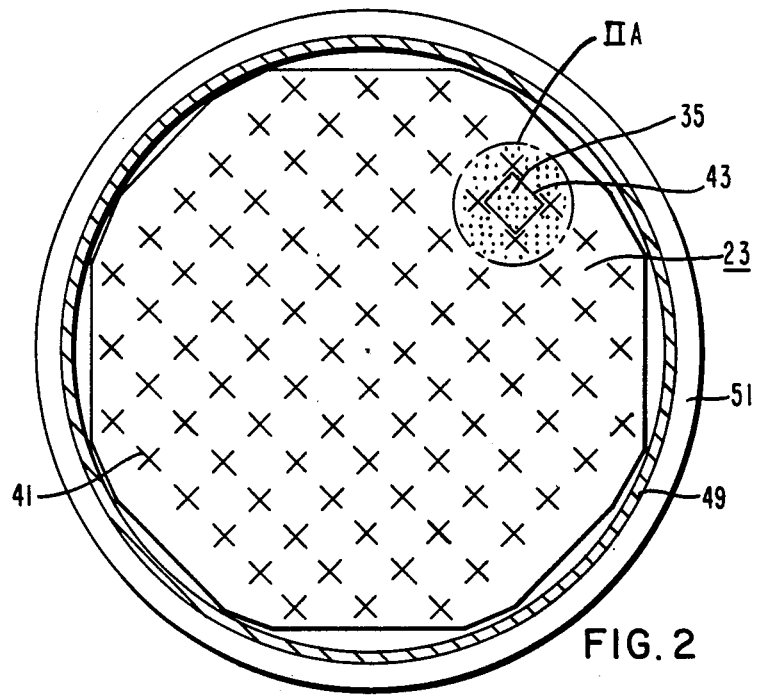
FIG. 2 is a view in transverse section taken alone line II—II of FIG. 1 with the guides shown diagrammatically.

The apparatus shown in FIGS. 1 through 4 is a nuclear reactor 11 including a vessel 13. The vessel 13 is composed of a lower circularly cylindrical section 15 terminating in a spherical bowl and a dome-shaped head 17. The lower section has horizontal inlet nozzles 19 and outlet nozzles 21. Typically, as shown in the Veronesi application, there are four inlet nozzles 19 and four outlet nozzles 21. The inlet nozzles 19 of the reactor 11 are at a lower level than the outlet nozzles 21.

Within the vessel 13, the reactor 11 includes the lower internals 23 and the upper internals 25. The lower internals 23 comprise the nuclear core which includes the conventional fuel assemblies 27 and the thimbles 29 shown separately but included in the fuel assemblies for the control rods and their conventional positioning supports (not shown). The lower internals 23 also include the lower core support plate 30 and the upper core plate 32. The core is mounted between core plates 30 and 32. During normal operation, during the earlier part of the fuel cycle, the WDCR's 31 are in the thimbles 29 and the gray control rods (not shown) are partly in their thimbles to a varying extent, while the RCC's are withdrawn from the core. The lower internals 23 also include a barrel or shell 33 which encloses the core and guides the incoming coolant. The barrel 33 terminates at its upper end in a flange 35 which is seated on a circumferential ledge 37 extending inwardly from the vessel 13 above the inlet nozzle 19. At its lower end the barrel is connected to the lower core plate 30. The barrel 33 confines the coolant flowing in through the inlet nozzles 19 to the annulus 39 between the barrel and the vessel.

Figure 5:
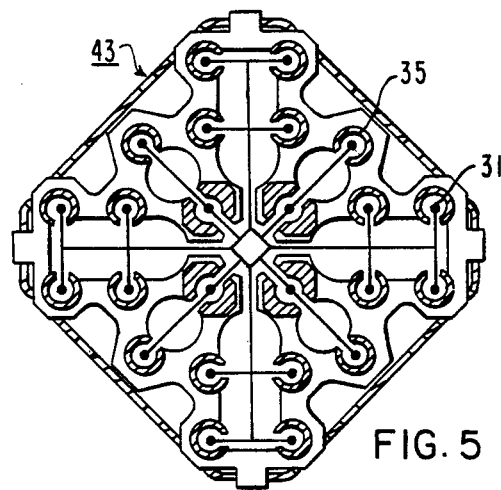
FIG. 5 is a plan view enlarged showing a plurality of WDCR's in their guide.
Figure 4:
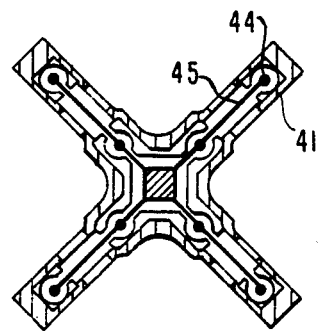
FIG. 4 is a plan view enlarged showing a control-rod unit in its guide.

The upper internals 25 include the guides 41 and 43 (FIGS. 2, 4, 5) for the control rods. The RCC's 44 and gray control rods (similar in geometry to the RCC's) are mounted on cruciform members 45 (FIG. 4) which are movable vertically, and protected by cruciform guides 41. The walls of the guides 41 are solid; i.e., non-permeable to coolant, but the guides are open at the top and bottom. Within the broader aspects of this invention the walls of the guides may be perforate. Perforate guides are feasible where the perforations are such that the transverse flow velocity of coolant flowing out of the guides through the perforations may be maintained relatively low. The guides 43 for the WDCR's 31 are parallelepipeds of square or rectangular cross section. The corners of the guides 43 are truncated so that they may be more accurately described as octagonal. The walls of each parallelepiped 43 are parallel and extend along the inwardly projecting legs of four adjacent cruciform guides 41 except at the periphery of the upper internals. The walls of the parallelepipeds 43 are solid; i.e., non-permeable to coolant and these guides are open at the top and bottom. A shell or barrel 49 (FIG. 1) encloses the guides 41 and 43. The barrel 49 is connected to the upper core plate 32 at its lower end. Intermediate its ends, the barrel 49 has a flange 51 which is contiguous to flange 35 of barrel 33 but is separated from this flange by a spring 53. A shell 55 contiguous to the vessel wall extends above flange 51. The control rods are driven by drive rods 57 (FIG. 3) which extend above the control rods. In this application, control-rod assembly means the assembly including control rods of any type and their guides.

Figure 3:
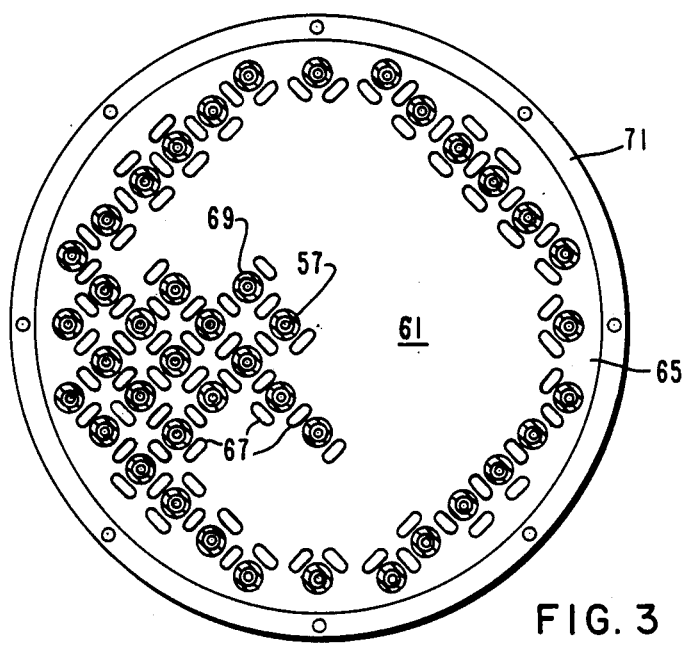
FIG. 3 is a view in transverse section taken along line III—III of FIG. 1.
Figure 2A:
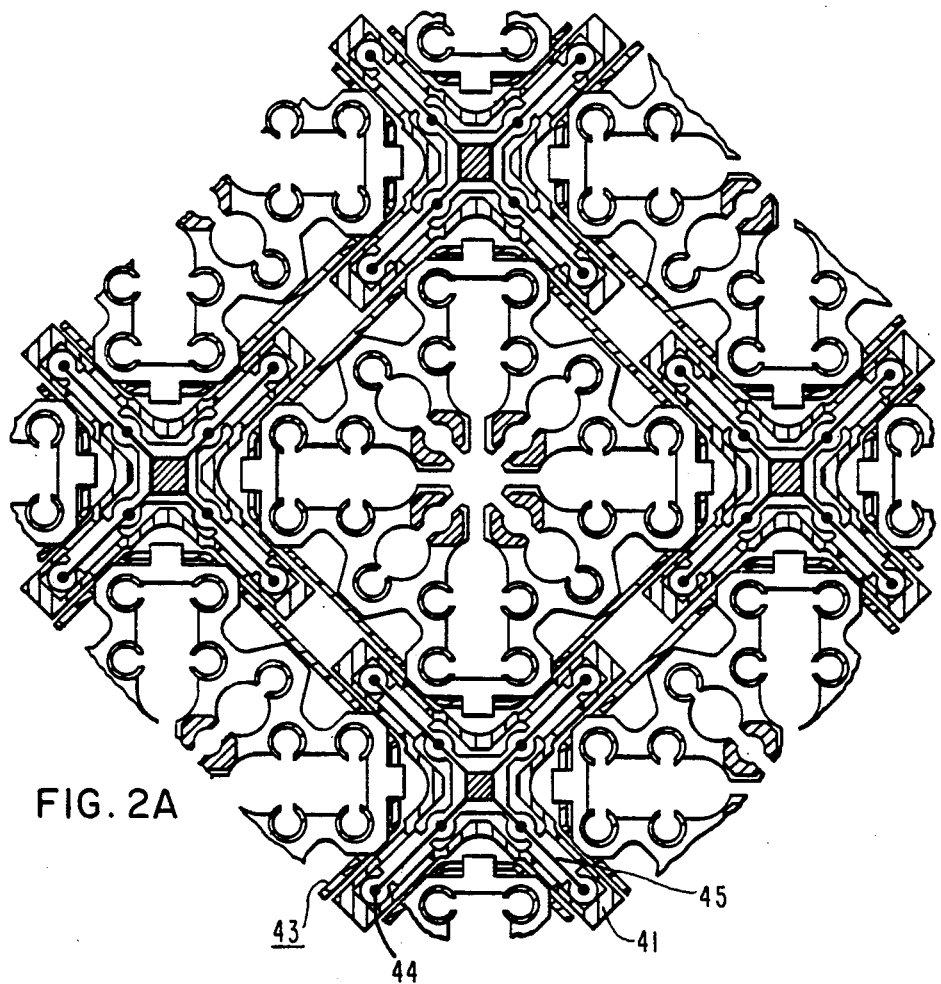
FIG. 2A is a fragmental view enlarged of the portion of FIG. 2 in circle IIA.

The reactor 11 includes a calandria 61 (FIGS. 1, 3). The calandria 61 includes an upper supporting plate 63 and a lower supporting plate 65. The lower supporting plate 65 has holes 67 throughout. The plates 63 and 65 taper away from each other from the center outwardly so that the volume per unit and of the plates between the plates increases from the center outwardly. Between the plates 63 and 65 a plurality of hollow members 69 are supported. Typically, the plates 61 and 63 and the hollow members 69 are composed of stainless steel resistant to the corrosive effect of the coolant. Typically, each hollow member 69 has an outside diameter of $3\frac{1}{2}$ inches, an inside diameter of 2 inches and a length of 24 to 36 inches. The mass and stiffness and strength of the members are such that the velocity at which they resonate mechanically where subject to a flowing liquid is far out of the range of the velocity of the coolant; i.e., 30 to 40 ft/sec. The members 69 are also of sufficient strength to withstand the stresses of normal transverse flow and cavitation or turbulence.

The calandria 61 is mounted on the upper internals with the rim 71 of the lower plate 65 bolted to the upper end of the barrel 49 and with the drive rods 57 passing through the hollow members 69. The upper plate 63 is circular and its diameter may be such that it engages the head 17 along its rim so that the calandria receives lateral support from the head 17.

In the fabrication of the reactor, the lower and upper internals are positioned in the cylindrical section 15 of the pressure vessel 13, as shown in FIG. 1, with the flange 51 above the flange 35 and the flange 35 on ledge 37. The calandria 61 is mounted on the barrel 49 and secured to the barrel. The head is appropriately positioned by positioning pins (not shown) which pass through the flanges and into the head. The head 17 is then compressed against the action of spring 53 so that its flange 75 engages the upper surface of the section 15. When the head 17 is pressed downwardly, it engages the outer shell 55 and presses it downwardly. The shell 55 carries the barrel 49, to which it is connected by cross member 51, downwardly carrying the calandria 61, which is bolted to barrel 49, downwardly. The lower plate 65 is in firm engagement with the tops of guides 41 and 43 and the coolant flow through the tops passes through the holes 67 in the plate. The flanges 51 and 35 are also brought into close contact and the flange 35 is brought into engagement with ledge 37. The joint between the head 17 and section 15 is sealed by a weld or an O-ring. The calandria 61 serves as upper support for the upper internals. The drive rods 57 are freely movable within tubes 69 during any movements of the calandria. The upper plate 63 of the calandria permits the passage of the drive rods 57.

In the normal use of the reactor, the coolant which flows in through inlet nozzles 19 is guided by annulus 39 in the direction of the arrow 77 under the lower core plate 30. The coolant then flows through the core and then up through the guides 41 and 43 and into the calandria through the holes 67 in the direction of the arrows 79 and 81. Then the coolant flows out through nozzles 21 in the direction of arrows 83. The vertical flow through the guides 41 and 43 does not exert stresses on the control rods 31 and 44 which would tend to produce failure. The transverse flow through the members 69, although at high velocity, do not cause members 69 to fail because of their construction. The drive rods are protected by the members 69. The tapered plates lend increased strength to the calandria. In addition, the flow velocity of the coolant is maintained substantially constant as more and more coolant flows through the radially outward holes.

Figure 6:
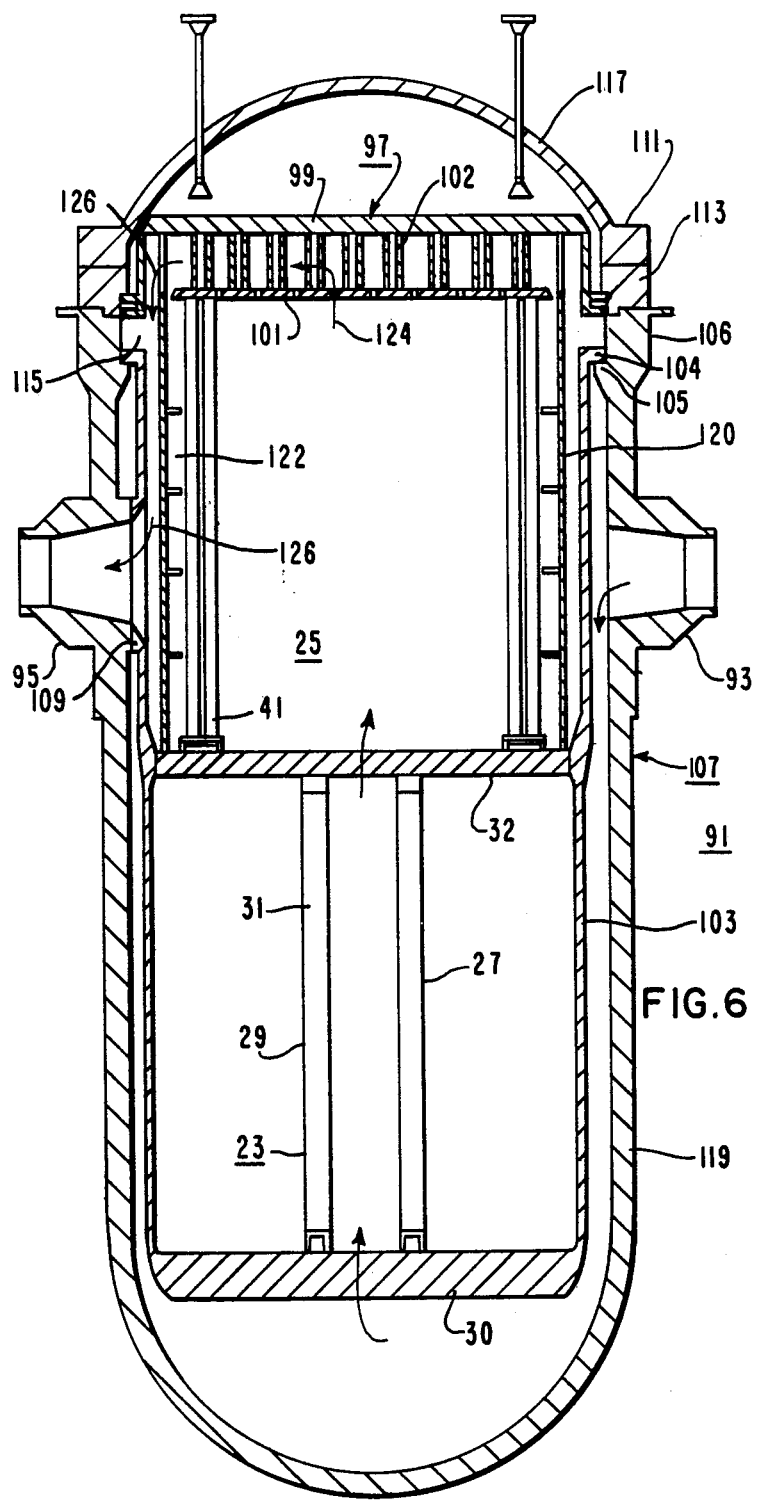
FIG. 6 is a view in longitudinal section of another embodiment of this invention.

The nuclear reactor 91 shown in FIG. 6 differs from the reactor 11 shown in FIG. 1 in two principal respects. The inlet nozzles 93 and the outlet nozzles 95 are at the same level and the calandria 97 has flat support plates 99 and 101 rather than tapered plates. The lower plate 101 has holes; the upper support plate 99 has openings for hollow member 102. In reactor 91 the barrel 103 enclosing the lower internals 23 has a flange 104 which engages a lip 105 of flange 106 near the top of the cylindrical section 107. The barrel 103 has openings around the output nozzles 95. The rims 109 of these openings around the boundary of the outlet nozzles 95 hug the boundary closely. Reactor 91 includes an adapter shell or barrel 111 which has a stepped seat 113 at its lower end. The upper plate 99 of the calandria 97 is bolted or welded to this barrel 111. The seat 113 is urged towards flange 106 against the action of spring 115 when the head 117 of the vessel 119 is compressed. The calandria serves as upper support for the upper internals 25.

The barrel 120 which surrounds the upper internals 75 and directs the flow generally vertically is connected to the upper supporting plate 99 by bolts (not shown) which permit removal of the calandria for maintenance or inspection of the guides 41 and 43. This barrel is perforated at its upper end to permit coolant flow from the calandria 97 to the annular space 122 in the direction of arrows 124 and 126.

A nuclear reactor, such as the one shown in FIG. 1, whose outlet nozzles 21 are at a substantially higher level than the inlet nozzles 19 has marked advantages. The circumferential joint between the flange 35 and the ledge 37 is closed. Bypass of inflow coolant between the inlet and outlet nozzle by reason of leakage through a gap at a joint of this type is precluded. In the reactor 91 shown in FIG. 6, there is bypass of the coolant at the joint between the rims 109 at the openings in barrel 103 and the boundaries of outlet nozzles 95. Another advantage results from the increased pressure head on the coolant in the vessel 13 because the outlet nozzle is high. If, undesirably, the primary coolant pump stops, this increased pressure head produces natural flow of the coolant.

Figure 7:
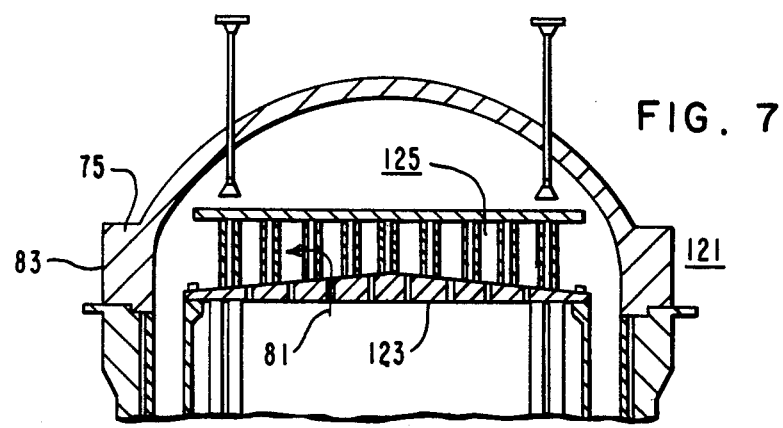
FIG. 7 is a fragmental view in section showing still another embodiment of this invention.

The reactor 121 shown in FIG. 7 differs from the reactor 11 in that only the lower support plate 123 of the calandria 125 is tapered from the center outwardly.

Figure 8:
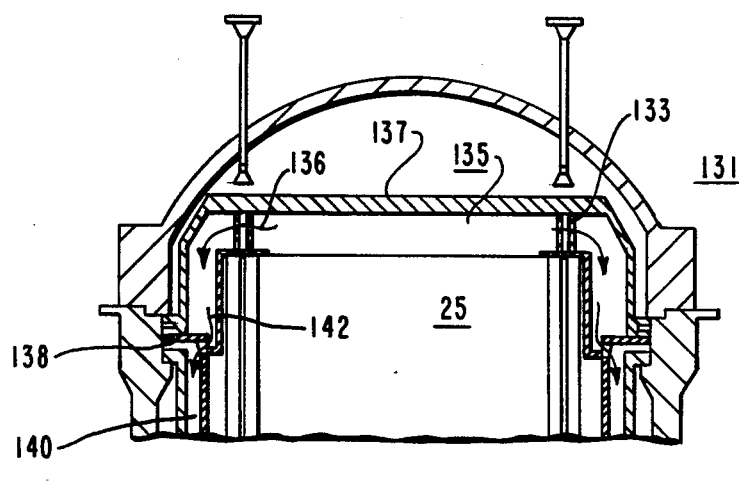
FIG. 8 is a fragmental view in section showing a further embodiment of this invention.

The reactor 131 shown in FIG. 8 differs from the reactors 11, 91 and 121 in that the hollow members 133 of the calandria 135 are supported only by an upper plate 137. In this case, the hollow members 133 are extensions of the guides 41 and 43 and serve as the upper mounting facility for the upper internals 25. The coolant flow after leaving the calandria 135 follows the direction of the arrows 136 and 142 through holes in a support flange 138 before passing into the annulus 140.

While embodiments of this invention have been disclosed herein, many modifications thereof are feasible. For example, a reactor with a calandria as disclosed may be provided in which the inlet nozzle are at a higher level than the outlet nozzles. Such a reactor has advantages. The emergency core-cooling system is improved. For a large break there is increased reflood pressure head. The reflood coolant fills the vessel on loss of coolant. The inflow coolant has a higher head because the inlet nozzles are at a higher level than the outlet nozzles. For a small break, there is no uncovery of the core because the piping of the plant is above the inlet nozzle so that the coolant in the piping is not siphoned out. This invention is not to be restricted except insofar as is necessitated by the spirit of the prior art.

We claim:

1. A nuclear reactor including a vessel, a nuclear core within said vessel, said vessel having at least a generally horizontal inlet nozzle and a generally horizontal outlet nozzle for circulating coolant through said core, control-rod assemblies including control rods movable from a plenum vertically above said core into said core, drive rods for said control rods and guide means for said control rods within said plenum, said drive rods extending vertically above said control rods, said coolant, after passing through said core, flowing generally vertically through and about said guide means and generally vertically out, a calandria, said calandria including a plurality of vertical hollow members and horizontal supporting means for supporting said members, and means for mounting said calandria contiguous to the top of said guide means, with said drive rods each guided within and protected by, a corresponding hollow member and the part of said calandria external to said hollow members in communication with said outlet nozzle, said supporting means permitting the coolant to flow from the top of said guide means into said calandria externally of said hollow members, said coolant thereafter flowing to said outlet nozzle generally transversely to said hollow members through said calandria, said hollow members each having a mass and stiffness and strength such that said members resist failure as a result of the transverse flow of said coolant.

2. The nuclear reactor of claim 1 wherein the calandria is constructed as a separate unit removable from the reactor separably from the guide means and the core.

3. The nuclear reactor of claim 1 wherein the hollow members have a mass and stiffness and strength such that said hollow members are resonant with a velocity of transverse flow of said coolant outside of the range of the actual velocity of the transverse flow of said coolant in said reactor, whereby the hollow members resist failure as a result of the transverse flow of said coolant.

4. The nuclear reactor of claim 1 wherein the outlet and inlet nozzles are at substantially different levels.

5. The reactor of claim 4 wherein the outlet nozzle is at a substantially higher level than the inlet nozzle.

6. The reactor of claim 1 wherein the calandria serves as the upper support for the upper internals.

7. The reactor of claim 1 wherein the guide means have substantially imperforate lateral walls but are perforate to the coolant at the top and bottom.

8. The nuclear reactor of claim 1 wherein the guide means is so structured that the coolant flows generally vertically through said guide means into the calandria and generally horizontally through the calandria, whereby substantially only the hollow members of the calandria are subject to transverse flow of the coolant.

9. A nuclear reactor including a vessel, a nuclear core within said vessel, said vessel having at least a generally horizontal inlet nozzle and a generally horizontal outlet nozzle for circulating coolant through said core, control-rod assemblies including control rods movable from a plenum vertically above said core into said core, drive rods for said control rods and guide means for said control rods within said plenum, said drive rods extending vertically above said control rods, said coolant, after passing through said core, flowing generally vertically through and about said guide means and generally vertically out, a calandria, said calandria including a plurality of vertical hollow members and horizontal supporting means for supporting said members, and means for mounting said calandria contiguous to the top of said guide means, with said drive rods each guided within, and protected by, a corresponding hollow member and the part of said calandria external to said hollow members in communication with said outlet nozzle, said supporting means permitting the coolant to flow from the top of said guide means into said calandria external to said hollow members, said coolant thereafter flowing through said calandria to said outlet nozzle generally transversely to said hollow members, said supporting means including upper and lower generally horizontal plates, at least one of said plates being tapered from the center towards the periphery whereby the flow velocity of the coolant is relatively constant as coolant from guide means extending towards the periphery penetrates into said volume, said hollow members each having a mass and stiffness and strength such that said members have a resonance velocity outside of the range of the velocity of said coolant and resist failure as a result of the transverse flow of said coolant.

10. The nuclear reactor of claim 9 wherein both the upper and lower plates are tapered from the center towards the periphery so that the flow volume of the coolant laterally of the hollow members increases towards the periphery.

11. For use in a nuclear reactor for conducting the transverse flow of coolant, a calandria including an upper plate, a lower plate, said lower plate having holes throughout, hollow members supported between said plates with their openings accessible through said lower plate, the volumes of hypothetical contiguous annular sections regarded as making up the region between said plates increasing between the centers of said plates and their peripheries, said hollow members having a mass and stiffness and strength such that said hollow members are resonant with a velocity of transverse flow of said coolant outside the range of the actual velocity of the transverse flow of said coolant in said reactor, whereby the hollow members resist failure as a result of the transverse flow of said coolant.

12. The calandria of claim 11 wherein at least one of the plates is tapered outwardly from its center to its periphery.

13. The calandria of claim 11 wherein both of said plates are tapered outwardly from the center to the periphery.

14. A nuclear reactor including a vessel, a nuclear core within said vessel, said vessel having at least a generally horizontal inlet nozzle and a generally horizontal outlet nozzle for circulating coolant through said core, control-rod assemblies including control rods movable from a plenum vertically above said core into said core, drive rods for said control rods and guide means for said control rods within said plenum, said drive rods extending vertically above said control rods, said coolant, after passing through said core, flowing generally vertically through and about said guide means and generally vertically out, a calandria, said calandria including a plurality of vertical hollow members and horizontal supporting means for supporting said members, and means for mounting said calandria contiguous to the tops of said guide mans, with said drive rods each guided within, and protected by, a corresponding hollow member and the part of said calandria external to said hollow members in communication with said outlet nozzle, said supporting means permitting the coolant to flow from the top of said guide means into said calandria external to said hollow members, said coolant thereafter flowing to said outlet nozzle generally transversely to said hollow members, said supporting means including upper and lower generally horizontal plates, at least one of said plates being tapered from the center towards the periphery whereby the flow velocity of the coolant is relatively constant as coolant from guide means extending towards the periphery penetrates into said volume, said hollow members each having a structure such as to resist failure as a result of the transverse flow of said coolant.

15. For use in a nuclear reactor for conducting the transverse flow of coolant, a calandria including an upper plate, a lower plate, said lower plate having holes throughout, hollow members supported between said plates with their openings accessible through said lower plate, the volume of hypothetical contiguous annular regions making up the volume of the region between said plates increasing between the centers of said plates and their peripheries, said hollow members having a structure such as to resist failure as a result of the transverse flow of said coolant.

16. A nuclear reactor including a vessel, a nuclear core within said vessel, said vessel having at least a generally horizontal inlet nozzle and a generally horizontal outlet nozzle for circulating coolant through said core, control-rod assemblies including control rods movable from a plenum vertically above said core into said core, drive rods for said control rods and guide means for said control rods within said plenum, said drive rods extending vertically above said control rods, said coolant, after passing through said core, flowing generally vertically through and about said guide means and generally vertically out, a calandria, said calandria including a plurality of vertical hollow members and horizontal supporting means for supporting said members, and means for mounting said calandria contiguous to the tops of said guide means, with said drive rods each guided within, and protected by, a corresponding hollow member and the part of said calandria external to said hollow members in communication with said outlet nozzle, said supporting means permitting the coolant to flow from the top of said guide means into said calandria external to said hollow members, said coolant thereafter flowing to said outlet nozzle generally transversely to said hollow members, said hollow members each being structure such as to resist failure as a result of the transverse flow of said coolant.

17. A nuclear reactor including a vessel, a nuclear core within said vessel, said vessel having at least a generally horizontal inlet nozzle and a generally horizontal outlet nozzle for circulating coolant through said core, control-rod assemblies including control rods moveable from a plenum vertically above said core into said core, drive rods for said control rods and guide means for said control rods within said plenum, said drive rods extending vertically above said control rods, said coolant, after passing through said core, flowing generally vertically through and about said guide means and generally vertically out, a calandria, said calandria including a plurality of vertical hollow members and horizontal supporting means for supporting said members, and means for mounting said calandria contiguous to the top of said guide means, with said drive rods each guided within, and protected by, a corresponding hollow member and the part of said calandria external to said hollow members in communication with said outlet nozzle, said supporting means permitting said coolant to flow from the top of said guide means into said calandria externally of said hollow members, said coolant thereafter flowing to said outlet nozzle generally transversely to said hollow members through said calandria, said hollow members each having a mass, stiffness and strength such that said members resist failure as a result of the transverse flow of said coolant, and said supporting means being so shaped that the volumes of hypothetical contiguous annular sections regarded as making up the total volume of the calandria, between said supporting means, through which said coolant flows laterally of said hollow members, increases towards the periphery of said calandria so that the flow velocity of said coolant is relatively constant as said coolant from said guide means extending towards the periphery penetrates into said volume.

* * * * *